Sept. 4, 1962          G. CAROZZO          3,051,994

INJECTION-MOULDING COMPOSITE ARTICLES

Filed Feb. 1, 1961

United States Patent Office 3,051,994
Patented Sept. 4, 1962

3,051,994
INJECTION-MOULDING COMPOSITE ARTICLES
Giorgio Carozzo, 27 Corso Moncalieri, Turin, Italy
Filed Feb. 1, 1961, Ser. No. 86,525
Claims priority, application Italy Feb. 27, 1960
3 Claims. (Cl. 18—55)

This invention relates to the manufacture of composite articles comprising a pair of sections of mutually differing injection-mouldable materials integral with each other along a pre-determined butt-weld line.

A composite article of the above character can consist of a unitary cover glass of plastics for signalling lights on a motor vehicle, for example, wherein the cover glass is required to have a red-colored and an orange-colored section for a stop-light and a direction-signal flashing light, respectively, and wherein a sharp demarcation line is desired between the sections. Both sections are generally made of transparent mass-colored polystyrene materials which differ from each other in color.

According to a conventional technique, one of the two sections is separately moulded and set in an appropriate mould, whereupon the section is transferred into a further mould into which the material for the second section is subsequently injected, so that the material sticks to the first mentioned section to thereby provide a unitary composite cover glass. Such a two-stage method requires an appreciable working time and mutually differing moulds; moreover, the stick-junction between the sections is relatively weak.

Alternatively, the two sections are separately moulded and subsequently cemented to each other. In this case too an appreciable working time and mutually differing moulds, plus time and cement necessary for the cementing step are required.

Simultaneous injection-moulding of the two differently colored sections in a single mould has been found impossible up to now on account of that the two differently colored materials commingle with each other at their contact (weld) region in the mould cavity thereby giving rise to a blurred weld-line of a wholly unpredictable and uncontrollable design and location.

It is an object of this invention to provide a method by which unitary composite articles of the above character can be successfully manufactured by simultaneously injection-moulding the two sections in a single mould.

Another object of this invention is to provide some novel, simple and useful expedients permitting a complete control of the design and location of the line along which the sections of the article fuse to each other during the injection process.

Figure 1:
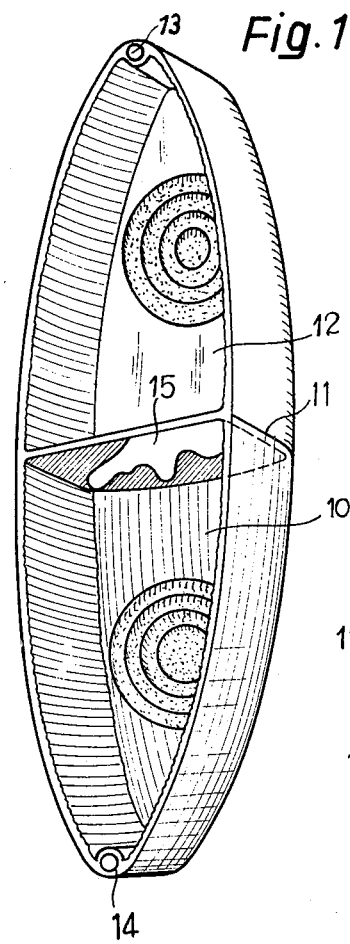
Figure 2:
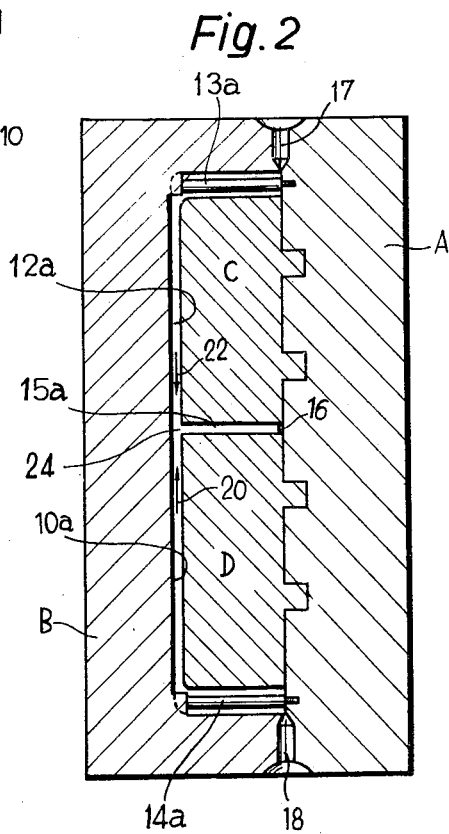

Further objects and features of this invention will result from the following description, reference being made to the accompanying drawing wherein:

FIGURE 1 is a perspective view of a two-color cover glass of plastics for signalling lights of a motor vehicle, and
FIGURE 2 is a cross-sectional view of a sectional mould for injection-moulding the cover glass shown on FIGURE 1.

The cover glass shown on FIG. 1 is of a general boat-shape including a transparent section 10 mass-colored in red and a transparent section 12 mass-colored in orange integral with section 10. In assembled condition on a motor vehicle, the red-colored section 10 houses a tail- and stop-light lamp, whereas the orange-colored section 12 houses a flashing light lamp for direction indicating purposes. A sharp demarcation line 11 between the two sections and an inner transverse partition 15 are usually required in order to avoid confusion of the red and orange signals when the respective lamps are switched-on. Tubular bosses 13, 14 are moulded integral with the cover glass at opposite longitudinal ends of the latter through which fixing screws or bolts are screwed into a lamp-base on the vehicle body.

The mould shown on FIGURE 2 for injection-moulding the above described cover glass comprises a base plate A, a removable cup-shaped cover section B having its circumferential edge tightly applied against the plate A, and a pair of core-pieces C, D fixed on the plate A. The members A, B, C, D jointly define a mould cavity which is complemental in shape to that of the cover glass of FIG. 1 and comprises sections 10a, 12a and 15a in which the sections 10, 12 and 15 of the cover glass are injection-formed in their moulding process. Pins 13a and 14a are moreover screwed into the base plate 3 at opposite longitudinal ends of the mould cavity to provide core-members for the respective tubular bosses 13 and 14.

Injection passages 17, 18 for a softened synthetic resin are formed at opposite longitudinal ends of the mould, and a venting passage 16 is formed at the end of the slot-like section 15a of the moulding cavity.

In use, orange-colored and red-colored synthetic resins in softened condition are simultaneously injected into the mould cavity through injection passages 17, 18, respectively. The two differently colored resins are thereby caused to flow from opposite ends of the mould cavity towards each other, as shown by arrows 20, 22 on FIG. 2, and towards the region 24 from which the slot-like section 15a extends towards the venting passage 16. It is relatively immaterial for the two flows to simultaneously reach the above region; generally, one of the flows such as 20, for example, will advance somewhat faster than the other, such as 22. Thus, the two flows meet each other along a "front line" which is quite close to the region 24 but the exact configuration and location of which is unpredictable. Generally, the front line will result of a sinuous configuration, depending upon local resistances encountered in sections 10a, 12a by the respective flows. Injection is however pursued through both passages 17, 18, whereby the two flows of resin are simultaneously forced against each other. It will be seen that, as injection is pursued, the above supposed "anticipating" flow 20 exerts no effective pressure on the "retarding" flow 22 for the former finds a way of escape consisting in the slot-like section 15a of the moulding cavity; on the contrary, the "retarding" flow 22 exerts an effective pressure on the flow 20 along the whole "front line," whereby the latter is displaced towards the region 24 and automatically stabilises therein in the instant the "retarding" flow reaches the way of escape 15a. The two flows jointly advance therefore in the slot-like section 15a towards the venting passage 16, thereby forming the partition 15 on the cover glass. Injection of the two resins is stopped when the slot-like section 15a is completely filled by their mixture. Once the resin content in the mould is set (by cooling the mould, for example) and the moulded article is stripped from the mould, the above mentioned "front line" provides the demarcation line 11 (FIG. 1) in the cover glass. The aspect of the partition 15 is generally immaterial for practical purposes; however, the partition may be subsequently painted black, for example, thereby to absolutely avoid transmission of light therethrough. Alternatively, the partition 15 can be removed, which is particularly indicated in connection with articles in which such a partition is useless.

It is essential to note that the front- or demarcation line 11 stabilizes along the "root" of the partition 15, that is, in the region in which the slot-like section 15a branches from the mould cavity sections 10a, 12a. In the specific case shown the line 11 is planar, whereby the section 15a is planar too; when a spatially curved demarcation line is required, the slot-like section or "escape way" 15a for the resins will be designed in a manner to originate from such a spatially curved line and to lead to a venting orifice or passage equivalent to that indicated by 16 on FIG. 2.

Thus, considering the above, this invention provides a method for injection-moulding a composite article comprising a pair of sections of mutually differing injection-mouldable materials integral with each other along a predetermined butt-weld line, the said method comprising providing in the injection-mould for the said article a slot-like escape way for the materials originating from and all over the linear region in the moulding cavity in which the said butt-weld line is to be located, thereby defining in the said moulding cavity a pair of cavity sections corresponding to the respective sections of the article; providing in the mould a pair of injection passages for the respective injection-mouldable materials opening each into a respective cavity section at a location spaced from the said linear region; simultaneously injecting the said materials in mouldable condition into the mould cavity through the respective injection passages thereby causing the materials to flow in the respective cavity sections towards each other and towards the said linear region till the materials contact each other still is mouldable condition and at least till both materials overflow from their moulding cavity sections through and all over the said linear region into the said slot-like escape way, setting the materials and stripping the moulded article.

In the case, such as the specific embodiment shown on the drawing, in which the slot-like escape way or part thereof is useful for injection-forming a part of the article (such as partition 15), injection of the materials will be pursued up to the moment at least in which the escape-way or said part thereof is filled with the materials, as described above.

The injection passages should not necessarily be arranged at opposite end sections of the moulding cavity in the mould. In the specific embodiment shown on the drawing the cover glass structure is substantially symmetrical with respect of the partition 15 and junction line 11, whereby the moulding cavity sections 10a, 12a provide for the two thermoplastic materials similar paths opposing similar resistances to the respective flows of the material. In other cases, the location of injection passages with respect of the junction line aimed at will be advantageously selected in a manner whereby the flows of thermoplastic materials will meet each other in the neighbourhood of the escape way such as 15a. Moreover, two or more injection passages can be associated with each section (such as 10a, 12a) of the moulding cavity in order to more efficiently control the flow distribution of the material injected into the section.

The venting passage 16 is advantageously of a restricted cross-sectional area as compared with that of the escape way 15a, whereby a desired amount of back-pressure is generated in the instant in which the co-current flows of thermoplastic materials in the escape way reach the venting passage and whereby the materials thoroughly fill their respective moulding cavity sections. The cross-sectional shape of the venting passage 16 is not critical. In the embodiment shown, the passage is semi-circular in cross-section and extends perpendicularly to the plane of FIG. 2. Alternatively, the passage can extend through the plate A towards the right on the figure and could consist of a thin slot, for example, cut in the plate.

What I claim is:

1. Method for injection-moulding a composite article comprising a pair of sections of mutually differing injection-mouldable materials integral with each other along a predetermined butt-weld line, the said method comprising: providing in an injection mould for the said article a slot-like escape way for the materials originating from and all over the linear region in the moulding cavity in which the said butt-weld line is to be located, thereby defining in the said moulding cavity a pair of cavity sections corresponding to the respective sections of the article; providing in the mould a pair of injection passages for the respective injection-mouldable materials opening each into a respective cavity section at a location spaced from the said linear region; simultaneously injecting the said materials in mouldable condition into the mould cavity through the respective injection passages thereby causing the materials to flow in the respective cavity sections towards each other and towards the said linear region till the materials contact each other still in mouldable condition and at least till both materials overflow from their moulding cavity sections through and all over the said linear region into the said slot-like escape way, setting the materials in the moulding cavity and stripping the moulded article from the mould.

2. In the method as claimed in claim 1, prosecuting the injection of the materials till the escape way is fully filled with the materials.

3. In the method as claimed in claim 1, moreover providing a venting passage for the said escape way in the mould of a reduced cross-sectional area as compared with that of the escape way and then effecting the simultaneous injection of the materials and prosecuting the injection thereby to fill with the materials the moulding cavity and escape way.

References Cited in the file of this patent

UNITED STATES PATENTS

| | | |
|---|---|---|
| 1,680,823 | Teed | Aug. 14, 1928 |
| 2,191,703 | Anderson | Feb. 27, 1940 |
| 2,275,591 | Leonard | Mar. 10, 1942 |
| 2,360,023 | Tucker | Oct. 10, 1944 |